United States Patent [19]
Perez

[11] Patent Number: 5,827,067
[45] Date of Patent: Oct. 27, 1998

[54] METHOD AND APPARATUS FOR EDUCATING MATHEMATICAL FUNCTIONS

[76] Inventor: Irma Maritza Perez, 176 Montgomery St., Bloomfield, N.J. 07003

[21] Appl. No.: 843,748

[22] Filed: Apr. 21, 1997

[51] Int. Cl.⁶ .................................................. G09B 23/02
[52] U.S. Cl. ............................................ 434/208; 434/206
[58] Field of Search .................................... 434/206, 208, 434/198, 191, 104

[56] References Cited

U.S. PATENT DOCUMENTS

| | | | |
|---|---|---|---|
| D. 354,314 | 1/1995 | Steininger | D21/6 |
| 1,662,503 | 3/1928 | Krieger | 434/198 |
| 2,965,980 | 12/1960 | Day | 434/198 |
| 3,289,329 | 12/1966 | Benson | 434/198 |
| 3,369,017 | 3/1967 | Koskela | 434/198 |
| 3,624,928 | 12/1971 | Felton | 434/198 |
| 4,360,341 | 11/1982 | Ghaznavi | 434/208 |
| 4,372,742 | 2/1983 | Wentworth | 434/199 |
| 4,424,039 | 1/1984 | Washburn | 434/189 |
| 4,445,865 | 5/1984 | Sellon | 434/207 |
| 4,445,867 | 5/1984 | Berg et al. | 434/198 |
| 4,633,070 | 12/1986 | Merkh | 434/198 |
| 4,634,385 | 1/1987 | Stemper | 434/198 |
| 4,790,757 | 12/1988 | Takahashi | 434/209 |
| 5,018,976 | 5/1991 | Kuyath | 434/207 |

FOREIGN PATENT DOCUMENTS

| | | | |
|---|---|---|---|
| 468546 | 1/1952 | Italy | 434/198 |

*Primary Examiner*—Paul J. Hirsch

[57] ABSTRACT

An apparatus comprises a first plurality of first numerical sequences, each numeral within each first numerical sequence being identified by a common indicia and each of the plurality of first numerical sequences having a different indicia; a second numerical sequence of numerals; and a selector which is relatively movable with respect to the first and second numerical sequences for selecting one numeral of the second sequence of numerals. The selector has third numerical sequence wherein each numeral of the third sequence has an indicia which corresponds to the common and different indicia of the first numerical sequence. The common and different indicia is color or pattern selective. In the method, the numeral of the first numerical sequence is a mathematical function of the numerals of the second and third numerical sequences.

20 Claims, 9 Drawing Sheets

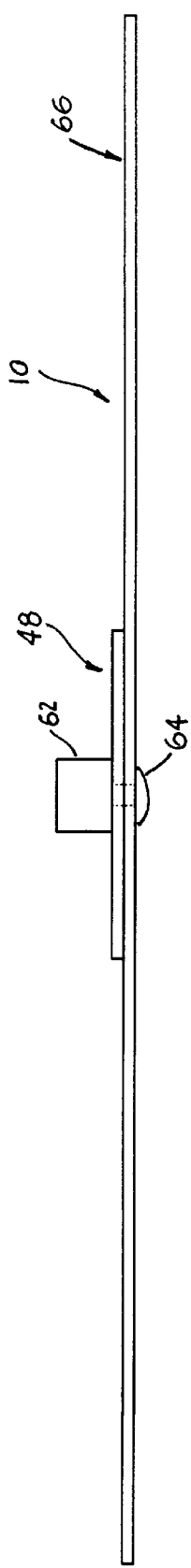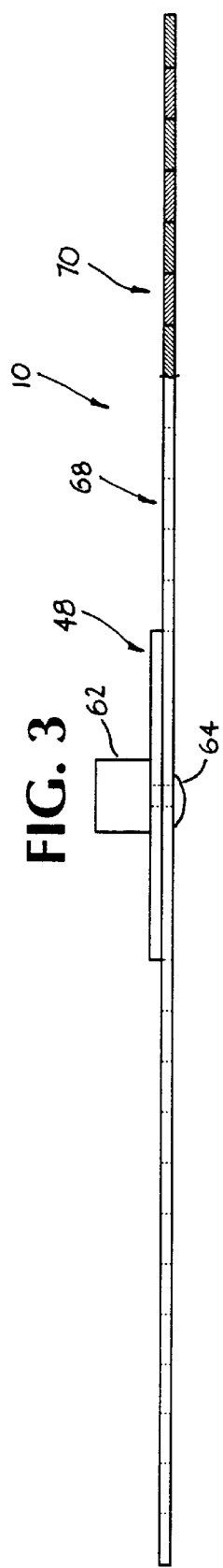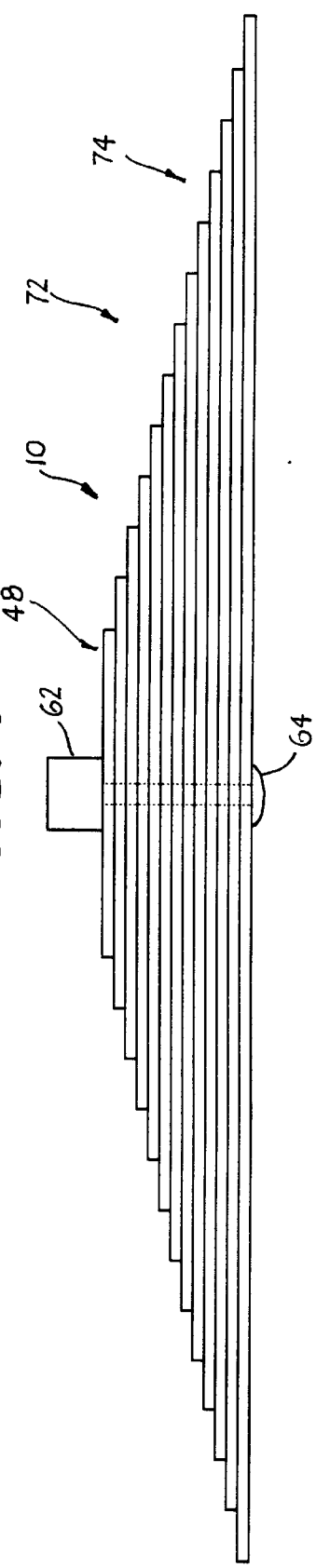

METHOD AND APPARATUS FOR EDUCATING MATHEMATICAL FUNCTIONS

BACKGROUND OF THE INVENTION

This invention is related to a method and apparatus for educational purposes and, in particular, for assisted- and self-instruction, independent or assisted teaching, practicing, and remediation of the mathematical functions of arithmetic, including addition, subtraction, multiplication and division.

Existing methods and apparatus for learning mathematical functions include flashcards, workbooks, rote memory techniques, repetitive written exercises and instructional devices. The known instructional devices and techniques include slidable and positional members which may be color coded to indicate the resultant mathematical function. Examples of such known instructional devices and methods are disclosed in U.S. Pat. Nos. 5,018,976 and 4,790,757 and 4,445,865 and 4,424,039 and 4,372,742.

The known instructional devices and methods often require considerable conceptual and physical dexterity by the user and may be particularly discouraging to students in the elementary school grades and students having a learning or physical disability. In addition, the known instructional devices and methods are not readily adaptable for independent and self-instruction and easy recognition of the correctness of the attempted mathematical function. Further, the known instructional devices and methods may be unable to ensure an understanding of the theory of mathematical functions. Still further, the known instructional devices and methods may not provide a positive confirmation of the learning experience and a demonstrated knowledge of mathematical functions. Still further, the known instructional devices may require considerable manufacturing processes and the devices themselves may be of considerable size and weight.

BRIEF SUMMARY OF THE INVENTION

In an aspect of the present invention, an apparatus comprises a first means for indicating a plurality of first numerical sequences, each numeral within each first numerical sequence being identified by a common indicia and each of the plurality of first numerical sequences having a different indicia. The apparatus further comprises a second means for indicating a second numerical sequence of numerals. The apparatus further comprises a selector means which is relatively movable with respect to the first and second means for selecting one numeral of the second sequence of numerals. The selector means has third numerical sequence wherein each numeral of the third sequenced has an indicia which corresponds to the common and different indicia of the first numerical sequence. In an aspect of the method, the numeral of the first numerical sequence is a mathematical function of the numerals of the second and third numerical sequences.

BRIEF DESCRIPTION OF THE SEVERAL VIEWS OF THE DRAWING

FIG. 2 is a cross-sectional view of one embodiment of the apparatus of FIGS. 1, 5, 6 and 7;

FIG. 3 is a partial cross-sectional view of another embodiment of the apparatus of FIGS. 1, 5, 6 and 7;

FIG. 4 is a cross-sectional view of a further embodiment of the apparatus of FIGS. 1, 5, 6 and 7;

DETAILED DESCRIPTION OF THE INVENTION

As shown in the Figures the apparatus comprises a plurality of numerical sequences having a given mathematical relationship for indicating the arithmetic functions of addition, subtraction, multiplication and division. The plurality of numerical sequences are arranged in a plurality of concentric circles wherein each of the numerical sequences are identified by selected indicia. The indicia may be color selective or pattern selective. If color selective, the colors for each of the numerical sequences are different from each other. If pattern selective, the pattern for each of the numerical sequences are different from each other. The number of colors or patterns is dependent on the number of the numerical values intended for the mathematical functional relationships. If the number of numerical values is, for example, twelve, it is necessary to have twelve different colors or patterns. The colors may include, for example, the six colors of the visible spectrum—red, orange, yellow, green, blue, indigo and violet—as well as white, gray, brown, pink, turquoise, tan or beige, light green. The colors may include, for example, the primary colors—red, blue and yellow—as well as mixtures thereof, e.g., purple, green, brown, orange. The colors may, for example, include variations in tone and intensity of a given color, e.g., light and dark green, light and dark brown, light and dark blue. If pattern selective, the pattern may, for example, include vertical, horizontal or diagonal lines and combinations thereof, dots, dashes, and combinations and portions thereof with or without vertical, horizontal or diagonal lines. The numerical values for each of the numerical sequences are preferably whole integers and the difference between each integer is a whole integer or a multiple thereof.

Figure 1:
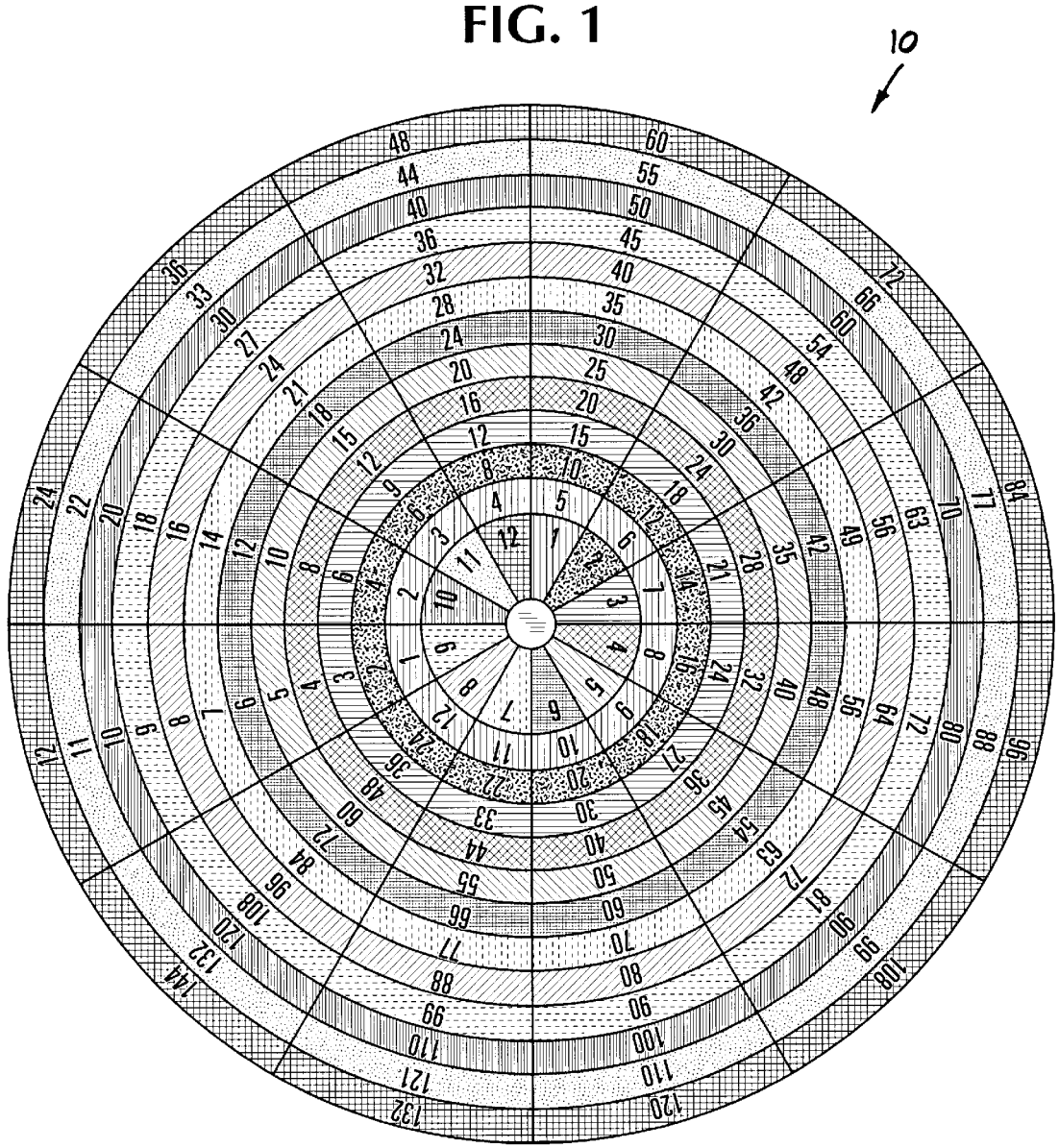
FIG. 1 is a plan view of one embodiment of an apparatus for educating mathematical functions.
Figure 1A:
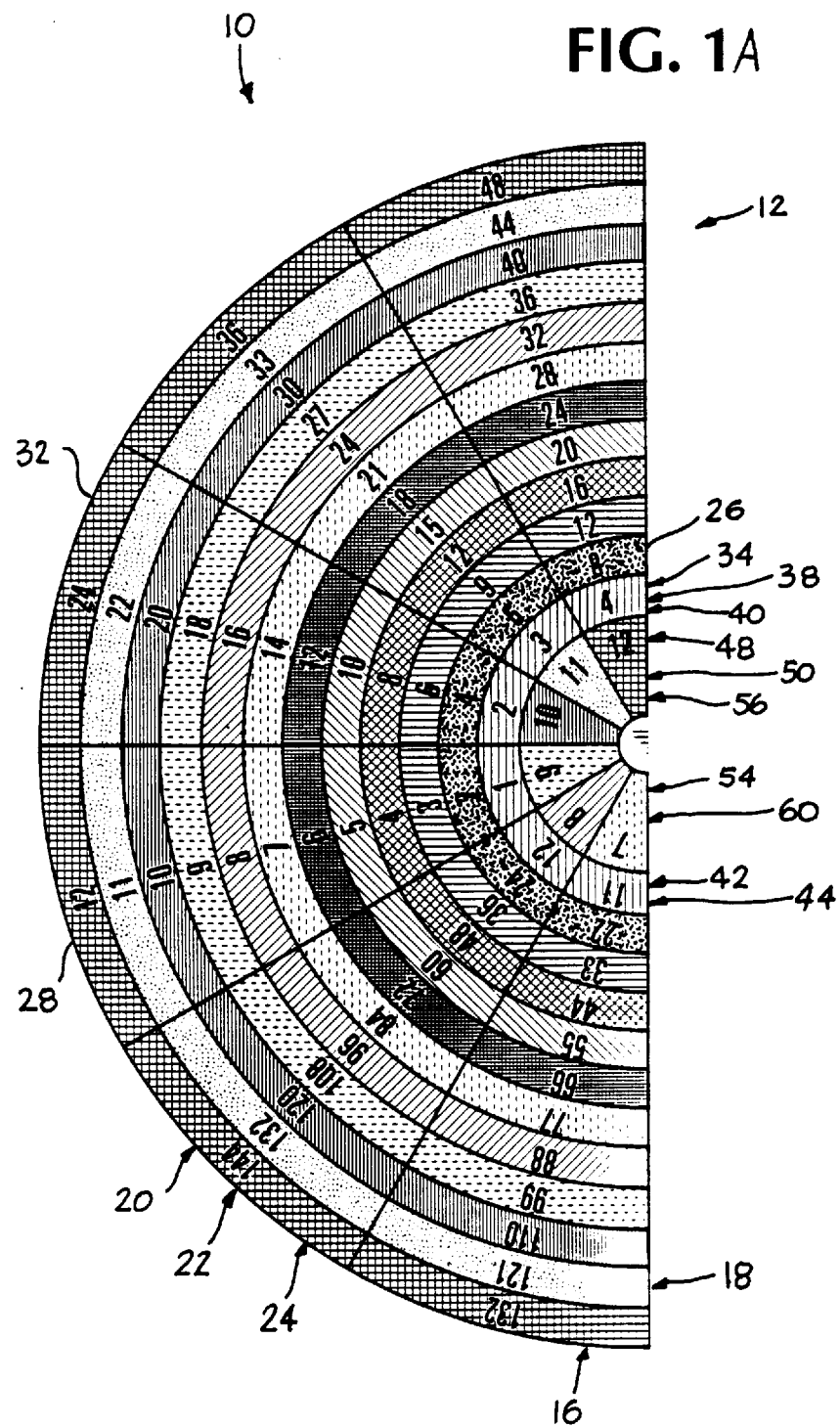
FIG. 1A is a plan view of the left-half of the apparatus of FIG. 1 which permits the use of reference characters for a description of the apparatus.

The embodiment shown in FIGS. 1 and 1A is directed to an apparatus 10 for educating the mathematical functions of multiplication and division. The apparatus comprises a first means 12 for indicating a plurality of first numerical sequences, each numeral within each first numerical sequence being identified by a common indicia 16 and each of the plurality of first numerical sequences having a different indicia 18. The embodiment of FIGS. 1 and 1A is illustrative for the multiplication or division of the numerals one to twelve. In the embodiment of FIGS. 1 and 1A the number of the plurality of first numerical sequences is eleven; however the number can be selected as desired. The plurality of first numerical sequences are formed in a plurality of concentric circles which may be circular bands 20, divided into a plurality of radial segments 22, e.g., twelve, wherein each radial segment comprises eleven arcuate segments 24 of each of the eleven concentric circles 20. Each of the eleven concentric circles 20 is identified by different indicia 18 and as shown the indicia is pattern selective. Alternatively, the different indicia 18 may be color selective. Each of the eleven arcuate segments 24 is identified by a numeral of the numerical sequence wherein each numeral is a whole integer and the arithmetical value of the difference between each numeral in each arcuate segment 24 is a whole integer. A whole integer numeral identifies each of the adjacent arcuate segments 24 of each concentric circle 20 and the arithmetical value of the difference between each numeral is a whole integer. As shown in FIG. 1A, for example, a given radial segment having a radially innermost arcuate segment 26 of the first means 12 is identified by the numeral two and consecutively increases by one for each arcuate segment of the same radial segment to the radially outermost arcuate segment 28 which is identified by the numeral twelve and the arithmetical value of the difference between each identifying numeral is one. In a selected radial segment having arcuate segments circumferentially adjacent to the given radial segment, the radially innermost arcuate segment of the first means 12 is identified by the numeral four and consecutively increases by two for each arcuate segment of the same radial segment to the radially outermost arcuate segment 32 which is identified by the numeral twenty-four and the arithmetical value of the difference between each identifying numeral is two. As shown in FIGS. 1 and 1A, and for the remaining radial segments, the radially innermost arcuate segment of the first means is identified by the numerals six, eight, ten, twelve, fourteen, sixteen, eighteen, twenty, twenty-two and twenty-four. The radially innermost arcuate segment identified by the numeral six increases by the arithmetical difference value of three to the outermost arcuate segment identified by the numeral thirty-six. Where the radially innermost arcuate segment is identified by the numeral eight, the arithmetical difference to the outermost arcuate segment is four. Where the radially innermost arcuate segment is identified by the numeral ten, the arithmetical difference to the outermost arcuate segment is five. Continuing circumferentially and in a similar manner, for the numeral twelve, the arithmetical difference is six; for the numeral fourteen, the arithmetical difference is seven; for the numeral sixteen, the arithmetical difference is eight; for the numeral eighteen, the arithmetical difference is nine; for the numeral twenty, the arithmetical difference is ten; for the numeral twenty-two, the arithmetical difference is eleven; and for the numeral twenty-four, the arithmetical difference is twelve.

The arithmetical difference in the numerals identifying adjacent arcuate segments of the same concentric circle is a whole integer. The radially innermost arcuate segment of the first means has the lowest numeral identification beginning with the numeral two and increases progressively and circumferentially for the arcuate segments in the same concentric circle by an arithmetical increase of two to the numeral identification twenty-four. The immediately circumferentially adjacent arcuate segments has a lowest numeral identification beginning with the numeral three and increases progressively and circumferentially for the arcuate segments in the same concentric circle by an arithmetical increase of three to the numeral identification thirty-six. Continuing radially for the lowest numeral identification beginning with four, the arithmetical increase is four to the numeral identification of forty-eight; beginning with five, the arithmetical increase is five to the numeral identification of sixty; beginning with six, the arithmetical increase is six to the numeral seventy-two; beginning with seven, the arithmetical increase is seven to the numeral eighty-four; beginning with eight, the arithmetical increase is eight to the numeral ninety-six; beginning with nine, the arithmetical increase is nine to the numeral one-hundred-eight; beginning with ten, the arithmetical increase is ten to the numeral one-hundred-twenty; beginning with eleven, the arithmetical increase is eleven to the numeral one-hundred-thirty-two; and beginning with twelve, the arithmetical increase is twelve to the numeral one-hundred-forty-four.

It is therefore apparent that the identifying numerals within each of the numerical sequences, in each of the radial segments 22 and the arcuate segments 24 for each of the concentric circles 20 of the first means 12 have an arithmetical difference by a whole integer or a multiple of a whole integer.

The embodiment shown in FIGS. 1 and 1A further comprises a second means 34 for indicating a second numerical sequence of numerals. The second means 34 is a circle which may be a circular band 38 radially inwardly adjacent to the innermost circular band of the first means 12 and concentric with the circular bands 20 of the first means 12. The second means 34 is divided into a plurality of radial segments 40 corresponding to the number of radial segments 22 of the first means, e.g., twelve, wherein each radial segment comprises twelve arcuate segments 42. Each of the radial segments 40 and arcuate segments 42 of the second means 34 is identified by a common indicia 44 which is different from the common indicia 16 and different indicia 18 identifying the first means 12. Each of the radial segments 40 and arcuate segments 42 of the second means 34 is identified by a numeral of a second numerical sequence of consecutive numerals. In the embodiment shown in FIGS. 1 and 1A the numerals begin with the numeral one and continue consecutively to the numeral twelve.

The embodiment shown in FIGS. 1 and 1A further includes a selector means 48 relatively movable in a circular direction with respect to the first means 12 and second means 34. As shown in the embodiment of FIG. 1, the selector means 48 comprises a circular member 50 having a center substantially concentric with the circular bands 20, 38, respectively of the first means 12 and second means 34. The selector means 48 is divided into a plurality of radial segments 54 corresponding to the number of radial segments 22, 40, respectively, of the first means 12 and second means 34, e.g., twelve, wherein each radial segment comprises twelve arcuate segments 56. Each of the radial segments 54 of the selector means 48 is identified by a numeral of a third numerical sequence of consecutive numerals. The third numerical sequence of the selector means 48 is the radially innermost concentric circle. In the embodiment shown in FIG. 1, the numerals begin with the numeral one and continue consecutively to the numeral twelve. Each numeral in the third numerical sequence has an indicia 60 corresponding to the common indicia 18 and different indicia 20 of the first numerical sequence.

Each numeral of the plurality of the first, second and third numerical sequences is arranged in a radial order on the concentric circles 20, 38, 50, respectively, each numeral having the different indicia 18 and each numeral differs by a whole integer.

The method of operating the embodiment of FIG. 1 for division is as follows. The user can choose a numeral from one of the first arcuate segments of one of the first radial segments from the plurality of first numerical sequences of the first means to indicate a dividend and a particular indicia. The user can choose the numeral of the second numerical sequence which is in the second arcuate segment of the second radial segment corresponding to the first radial segment to indicate a divisor. The user aligns the indicia of the selector means which is common to the indicia of the numeral of the first numerical sequence. The numeral indicated by the indicia of the selector means which is common to the indicia of the first numerical means is the quotient. For example, the user chooses the numeral forty-eight as the dividend from the first numerical sequence. Numerical forty-eight indicates a particular indicia, e.g., a graph-like grid of horizontal and vertical lines. The user chooses the numeral four, the divisor, from the second numerical sequence. The user aligns the indicia of the selector means which is common to the indicia of the first numerical sequence, i.e., the graph-like grid. The numeral twelve, the quotient, is indicated by the indicia of the selector means which is common to the indicia of the first numerical sequence.

The method of operating the embodiment of FIG. 1 for multiplication, which is the inverse of division, is as follows. The user moves the selector means to align the numeral twelve, the multiplier factor, of the third numerical sequence with the numeral four, the multiplicand factor, of the second numerical sequence. The numeral twelve, the multiplier factor, indicates a particular indicia. The user finds the indicia of the first numerical sequence in the radial segment chosen by the selector means which is common to the indicia of the multiplier. The numeral forty-eight, the product, is indicated by the indicia of the first numerical sequence which is common to the indicia of the third numerical sequence.

Figure 5:
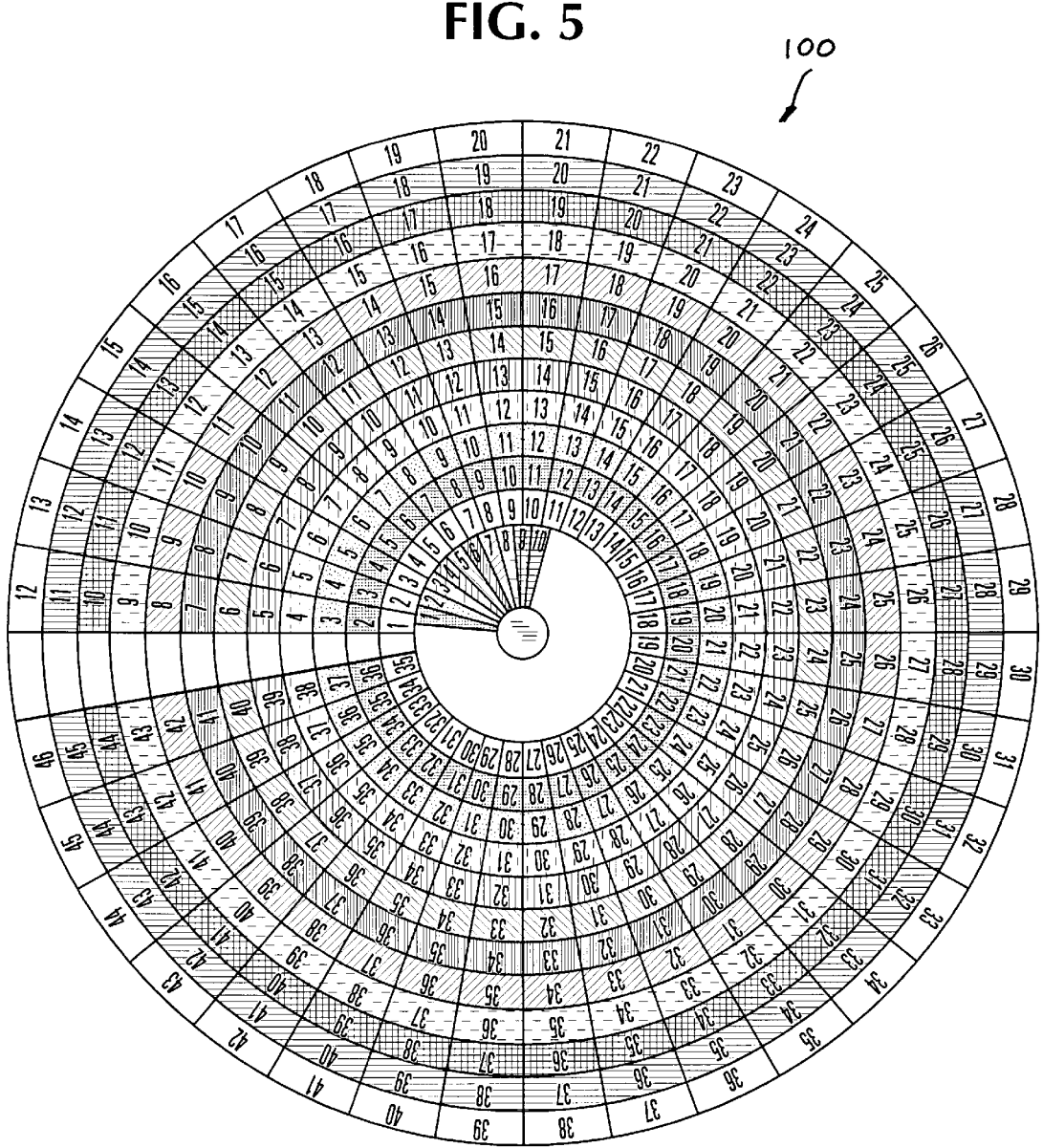
FIG. 5 is a plan view of another embodiment of an apparatus for educating mathematical functions.
Figure 5A:
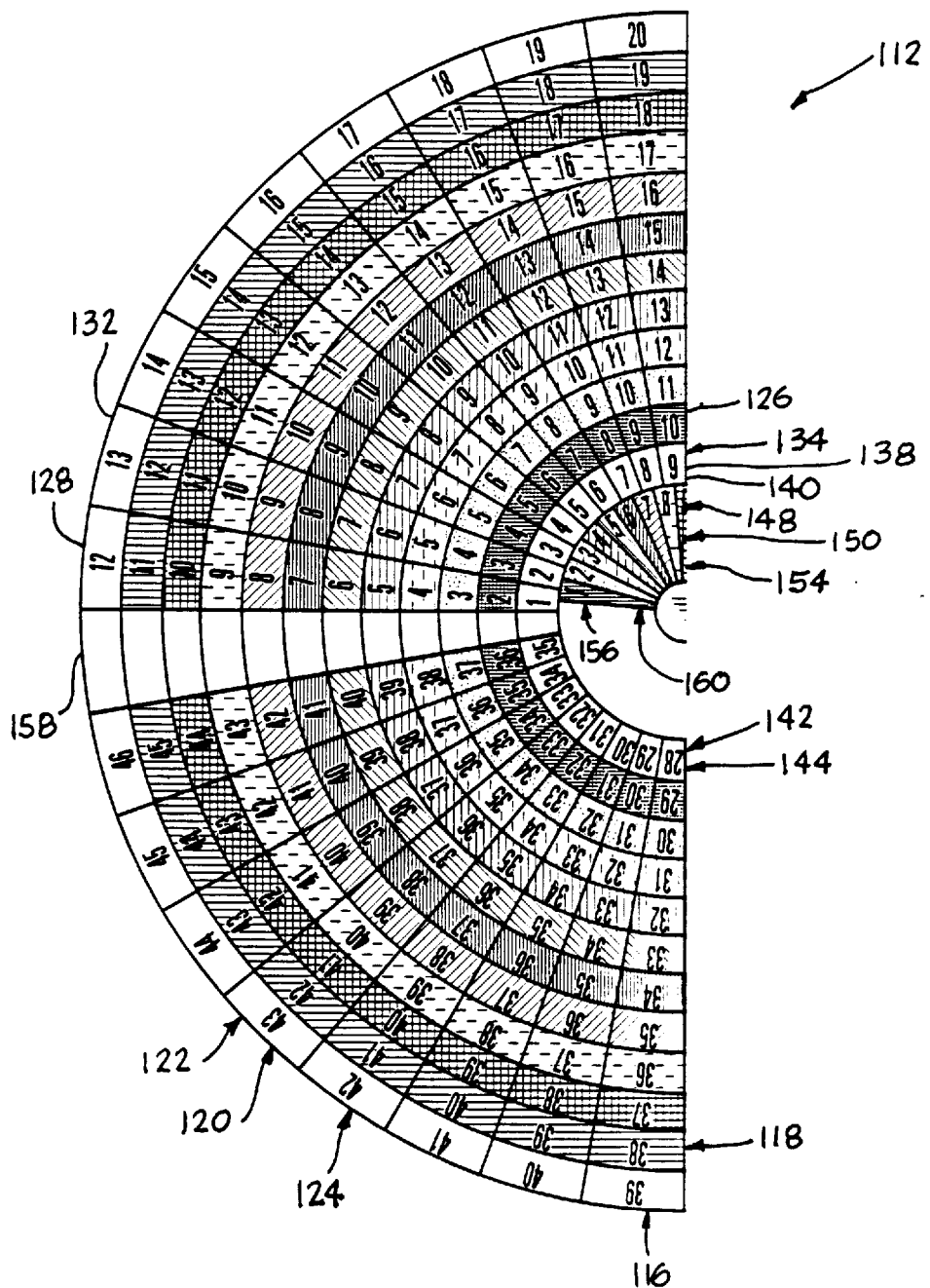
FIG. 5A is a plan view of the left-half of the apparatus of FIG. 5 which permits the use of reference characters for a description of the apparatus.

The embodiment shown in FIGS. 5 and 5A is directed to an apparatus 100 for educating the mathematical functions of addition and subtraction. The apparatus comprises a first means 112 for indicating a plurality of first numerical sequences, each numeral within each first numerical sequence being identified by a common indicia 116 and each of the plurality of first numerical sequences having a different indicia 118. The embodiment of FIGS. 5 and 5A is illustrative for the addition or subtraction of the numerals one to forty-six. In the embodiment of FIGS. 5 and 5A the number of the plurality of first numerical sequences is eleven; however the number can be selected as desired. The plurality of first numerical sequences are formed in a plurality of concentric circles which may be circular bands 120, divided into a plurality of radial segments 122, e.g., thirty-five, wherein each radial segment comprises eleven arcuate segments 124 of each of the eleven concentric circles 120. Each of the eleven concentric circles 120 is identified by different indicia 118 and as shown the indicia is pattern selective. Alternatively, the different indicia 118 may be color selective. Each of the eleven arcuate segments 124 is identified by a numeral of the numerical sequence wherein each numeral is a whole integer and the arithmetical value of the difference between each numeral in each arcuate segment 124 is a whole integer. A whole integer numeral identifies each of the adjacent arcuate segments 124 of each concentric circle 120 and the arithmetical value of the difference between each numeral is a whole integer. As shown in FIG. 5A, for example, a given radial segment having a radially innermost arcuate segment 126 of the first means 112 is identified by the numeral two and consecutively increases by one for each arcuate segment of the same radial segment to the radially outermost arcuate segment 128 which is identified by the numeral twelve and the arithmetical value of the difference between each identifying numeral is one. In a selected radial segment having arcuate segments circumferentially adjacent to the given radial segment, the radially innermost arcuate segment of the first means 112 is identified by the numeral three and consecutively increases by one for each arcuate segment of the same radial segment to the radially outermost arcuate segment 132 which is identified by the numeral thirteen and the arithmetical value of the difference between each identifying numeral is one. As shown in FIGS. 5 and 5A, and for the remaining radial segments, each of the radially innermost arcuate segments of the first means is identified by the numerically consecutive numerals four to thirty-six. Each of the radially innermost arcuate segments identified by the numerically consecutive numerals increases by the arithmetical difference value of one to the outermost arcuate segment identified by the numeral forty-six.

The arithmetical difference in the numerals identifying adjacent arcuate segments of the same concentric circle is a whole integer. The radially innermost arcuate segment of the first means has the lowest numeral identification beginning with the numeral two and increases progressively and circumferentially for the arcuate segments in the same concentric circle by an arithmetical increase of one to the numeral identification thirty-six. The immediately circumferentially adjacent arcuate segments has a lowest numeral identification beginning with the numeral three and increases progressively and circumferentially for the arcuate segments in the same concentric circle by an arithmetical increase of one to the numeral identification thirty-seven. Continuing radially for the lowest numeral identification beginning with four, the arithmetical increase is one to the numeral identification of thirty-eight; beginning with five, the arithmetical increase is one to the numeral identification of thirty-nine; beginning with six, the arithmetical increase is one to the numeral forty; beginning with seven, the arithmetical increase is one to the numeral forty-one; beginning with eight, the arithmetical increase is one to the numeral forty-two; beginning with nine, the arithmetical increase is one to the numeral forty-three; beginning with ten, the arithmetical increase is one to the numeral forty-four; beginning with eleven, the arithmetical increase is one to the numeral forty-five; and beginning with twelve, the arithmetical increase is one to the numeral forty-six.

It is therefore apparent that the identifying numerals within each of the numerical sequences, in each of the radial segments 122 and the arcuate segments 124 for each of the concentric circles 120 of the first means 112 have an arithmetical difference by a whole integer.

The embodiment shown in FIGS. 5 and 5A further comprises a second means 134 for indicating a second numerical sequence of numerals. The second means 134 is a circle which may be a circular band 138 radially inwardly adjacent to the innermost circular band of the first means 112 and concentric with the circular bands 120 of the first means 112. The second means 134 is divided into a plurality of radial segments 140 corresponding to the number of radial segments 122 of the first means, e.g., thirty-five, wherein each radial segment comprises thirty-five arcuate segments 142. Each of the radial segments 140 and arcuate segments 142 of the second means 134 is identified by a common indicia 144 which is different from the common indicia 116 and different indicia 118 identifying the first means 112. Each of the radial segments 140 and arcuate segments 142 of the second means 134 is identified by a numeral of a second numerical sequence of consecutive numerals. In the embodiment shown in FIGS. 5 and 5A the numerals begin with the numeral one and continue consecutively to the numeral thirty-five.

The embodiment shown in FIGS. 5 and 5A further includes a selector means 148 relatively movable in a circular direction with respect to the first means 112 and second means 134. As shown in the embodiment of FIGS. 5 and 5A, the selector means 148 comprises a circular member 150 having a center substantially concentric with the circular bands 120, 138, respectively of the first means 112 and second means 134. The selector means 148 is divided into a plurality of ten radial segments 154, wherein each radial segment comprises ten arcuate segments 156. Each of the radial segments 154 of the selector means 148 is identified by a numeral of a third numerical sequence of consecutive numerals. The third numerical sequence of the selector means 148 is the radially innermost concentric circle. In the embodiment shown in FIG. 5, the numerals begin with the numeral one and continue consecutively to the numeralten. Each numeral in the third numerical sequence has an indicia 160 corresponding to the common indicia 118 and different indicia 120 of the first numerical sequence.

Each numeral of the plurality of the first, second and third numerical sequences is arranged in a radial order on the concentric circles 120, 138, 150, respectively, each numeral having the different indicia 118 and each numeral differs by a whole integer.

The method of operating the embodiment of FIG. 5 for subtraction is as follows. The user can choose a numeral from one of the first arcuate segments of one of the first radial segments from the plurality of first numerical sequences of the first means to indicate a minuend and a particular indicia. The user can choose a numeral of the second numerical sequence which is in the second arcuate segment of the second radial segment corresponding to the first radial segment to indicate a subtrahend. The user aligns the indicia of the selector means which is common to the indicia of the numeral of the first numerical sequence. The numeral indicated by the indicia of the selector means which is common to the indicia of the first numerical means is the difference. For example, the user chooses the numeral sixteen as the minuend from the first numerical sequence. Numeral sixteen indicates a particular indicia, e.g., a graph-like grid of horizontal and vertical lines. The user chooses the numeral nine, the subtrahend, from the second numerical sequence. The user aligns the indicia of the selector means which is common to the indicia of the first numerical sequence, i.e., the graph-like grid. The numeral seven, the difference, is indicated by the indicia of the selector means which is common to the indicia of the first numerical sequence.

The method of operating the embodiment of FIG. 5 for addition, which is the inverse of subtraction, is as follows. The user moves the selector means to align the numeral seven, an addition factor, of the third numerical sequence with the numeral nine, the an addition factor, of the second numerical sequence. The numeral seven, the sum, indicates a particular indicia. The user finds the indicia of the first numerical sequence in the radial segment chosen by the selector means which is common to the indicia of the multiplier. The numeral sixteen, the sum, is indicated by the indicia of the first numerical sequence which is common to the indicia of the third numerical sequence.

Figure 7:
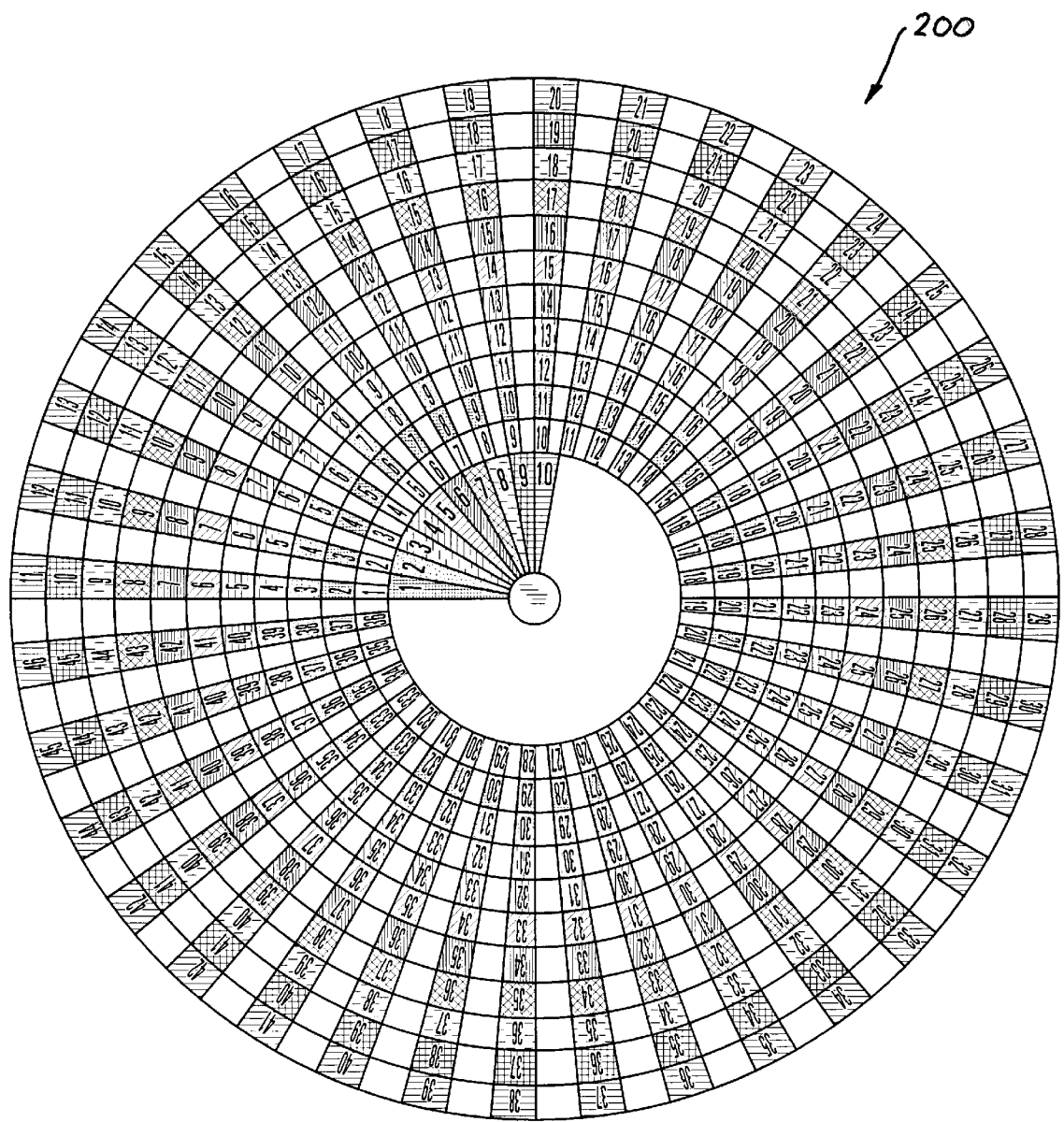
FIG. 7 is a plan view of an additional embodiment of an apparatus for educating mathematical functions.
Figure 7A:
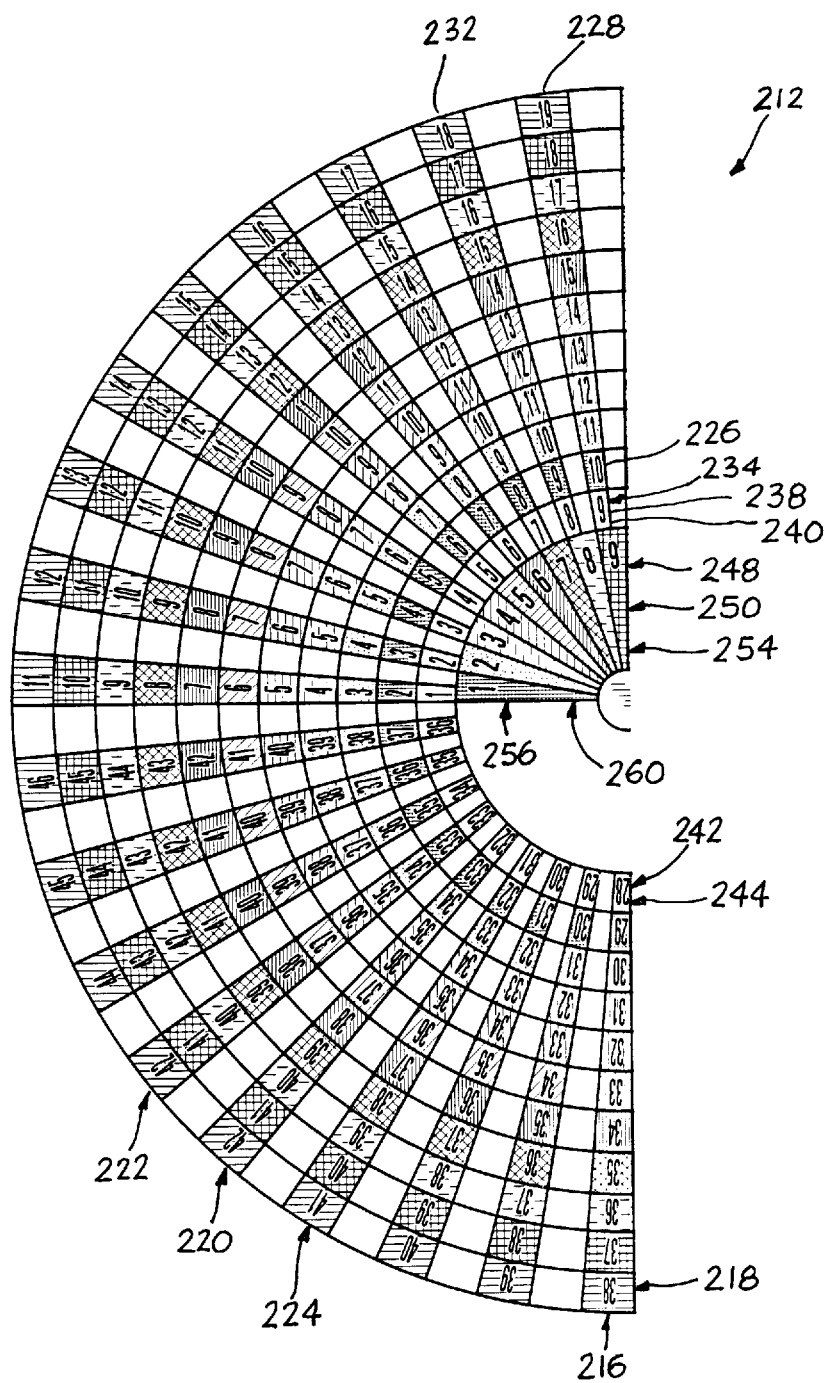
FIG. 7A is a plan view of the left-half of the apparatus of FIG. 7 which permits the use of reference characters for a description of the apparatus.

The embodiment shown in FIGS. 7 and 7A is directed to an apparatus 200 for educating the mathematical functions of addition and subtraction. The apparatus comprises a first means 212 for indicating a plurality of first numerical sequences, each numeral within each first numerical sequence being identified by a common indicia 216 and each of the plurality of first numerical sequences having a different indicia 218. The embodiment of FIGS. 7 and 7A is illustrative for the addition or subtraction of the numerals one to forty-six. In the embodiment of FIGS. 7 and 7A the number of the plurality of first numerical sequences is ten; however the number can be selected as desired. The plurality of first numerical sequences are formed in a plurality of concentric circles which may be circular bands 220, divided into a plurality of radial segments 222, e.g., seventy-two. Alternating radial segments 220 are identified by numerals and alternating radial segments are unnumbered. This arrangement permits easier identification of each of the numbered radial segments 220. Therefore, there are thirty-six numbered radial segments. Each radial segment comprises eleven arcuate segments 224 of each of the ten concentric circles 220. Each of the ten concentric circles 220 is identified by different indicia 218 and as shown the indicia is pattern selective. Alternatively, the different indicia 218 may be color selective. Each of the eleven numbered arcuate segments 224 is identified by a numeral of the numerical sequence wherein each numeral is a whole integer and the arithmetical value of the difference between each numeral in each arcuate segment 224 is a whole integer. A whole integer numeral identifies each of the adjacent arcuate segments 224 of each concentric circle 220 and the arithmetical value of the difference between each numeral is a whole integer. As shown in FIG. 7A, for example, a given numbered radial segment having a radially innermost numbered arcuate segment 226 of the first means 212 is identified by the numeral ten and consecutively increases by one for each numbered arcuate segment of the same radial segment to the radially outermost numbered arcuate segment 228 which is identified by the numeral nineteen and the arithmetical value of the difference between each identifying numeral is one. In a selected radial segment having numbered arcuate segments circumferentially adjacent to the given numbered radial segment, the radially innermost numbered arcuate segment of the first means 212 is identified by the numeral nine and consecutively increases by one for each numbered arcuate segment of the same radial segment to the radially outermost numbered arcuate segment 232 which is identified by the numeral eighteen and the arithmetical value of the difference between each identifying numeral is one. As shown in FIGS. 7 and 7A, and for the remaining radial segments, each of the radially innermost numbered arcuate segments of the first means is identified by the numerically consecutive numerals two to eight and eleven to thirty-seven. Each of the radially innermost numbered arcuate segments identified by the numerically consecutive numerals increases by the arithmetical difference value of one to the outermost numbered arcuate segment identified by the numeral forty-six.

The arithmetical difference in the numerals identifying adjacent numbered arcuate segments of the same concentric circle is a whole integer. The radially innermost numbered arcuate segment of the first means has the lowest numeral identification beginning with the numeral two and increases progressively and circumferentially for the numbered arcuate segments in the same concentric circle by an arithmetical increase of one to the numeral identification thirty-seven. The immediately circumferentially adjacent numbered arcuate segments has a lowest numeral identification beginning with the numeral three and increases progressively and circumferentially for the numbered arcuate segments in the same concentric circle by an arithmetical increase of one to the numeral identification thirty-eight. Continuing radially for the lowest numeral identification beginning with four, the arithmetical increase is one to the numeral identification of thirty-nine; beginning with five, the arithmetical increase is one to the numeral identification of forty; beginning with six, the arithmetical increase is one to the numeral forty-one; beginning with seven, the arithmetical increase is one to the numeral forty-two; beginning with eight, the arithmetical increase is one to the numeral forty-three; beginning with nine, the arithmetical increase is one to the numeral forty-four; beginning with ten, the arithmetical increase is one to the numeral forty-five; and beginning with eleven, the arithmetical increase is one to the numeral forty-six.

It is therefore apparent that the identifying numerals within each of the numerical sequences, in each of the numbered radial segments 222 and the numbered arcuate segments 224 for each of the concentric circles 220 of the first means 212 have an arithmetical difference by a whole integer.

The embodiment shown in FIGS. 7 and 7A further comprises a second means 234 for indicating a second numerical sequence of numerals. The second means 234 is a circle which may be a circular band 238 radially inwardly adjacent to the innermost circular band of the first means 212 and concentric with the circular bands 220 of the first means 212. The second means 234 is divided into a plurality of radial segments 240 corresponding to the number of radial segments 222 of the first means, e.g., seventy-two. Alternating radial segments 220 are identified by numerals and alternating radial segments 220 are unnumbered. This arrangement permits easier identification of each of the numbered radial segments. Therefore, there are thirty-six numbered radial segments. Each radial segment comprises thirty-six numbered arcuate segments 242. Each of the numbered radial segments 240 and numbered arcuate segments 242 of the second means 234 is identified by a common indicia 244 which is different from the common indicia 216 and different indicia 218 identifying the first means 212. Each of the numbered radial segments 240 and numbered arcuate segments 242 of the second means 234 is identified by a numeral of a second numerical sequence of consecutive numerals. In the embodiment shown in FIGS. 7 and 7A the numerals begin with the numeral one and continue consecutively to the numeral thirty-six.

The embodiment shown in FIGS. 7 and 7A further includes a selector means 248 relatively movable in a circular direction with respect to the first means 212 and second means 234. As shown in the embodiment of FIGS. 7 and 7A, the selector means 248 comprises a circular member 250 having a center substantially concentric with the circular bands 220, 238, respectively of the first means 212 and second means 234. The selector means 248 is divided into a plurality of ten radial segments 254, wherein each radial segment comprises ten arcuate segments 256. Each of the radial segments 254 of the selector means, 248 is identified by a numeral of a third numerical sequence of consecutive numerals. The third numerical sequence of the selector means 248 is the radially innermost concentric circle. In the embodiment shown in FIG. 7, the numerals begin with the numeral one and continue consecutively to the numeral ten. Each numeral in the third numerical sequence has an indicia 260 corresponding to the common indicia 218 and different indicia 220 of the first numerical sequence.

Each numeral of the plurality of the first, second and third numerical sequences is arranged in a radial order on the concentric circles 220, 238, 250, respectively, each numeral having the different indicia 218 and each numeral differs by a whole integer.

The method of operating the embodiment of FIG. 7 for subtraction and addition is the same as for FIG. 5.

Figure 6:
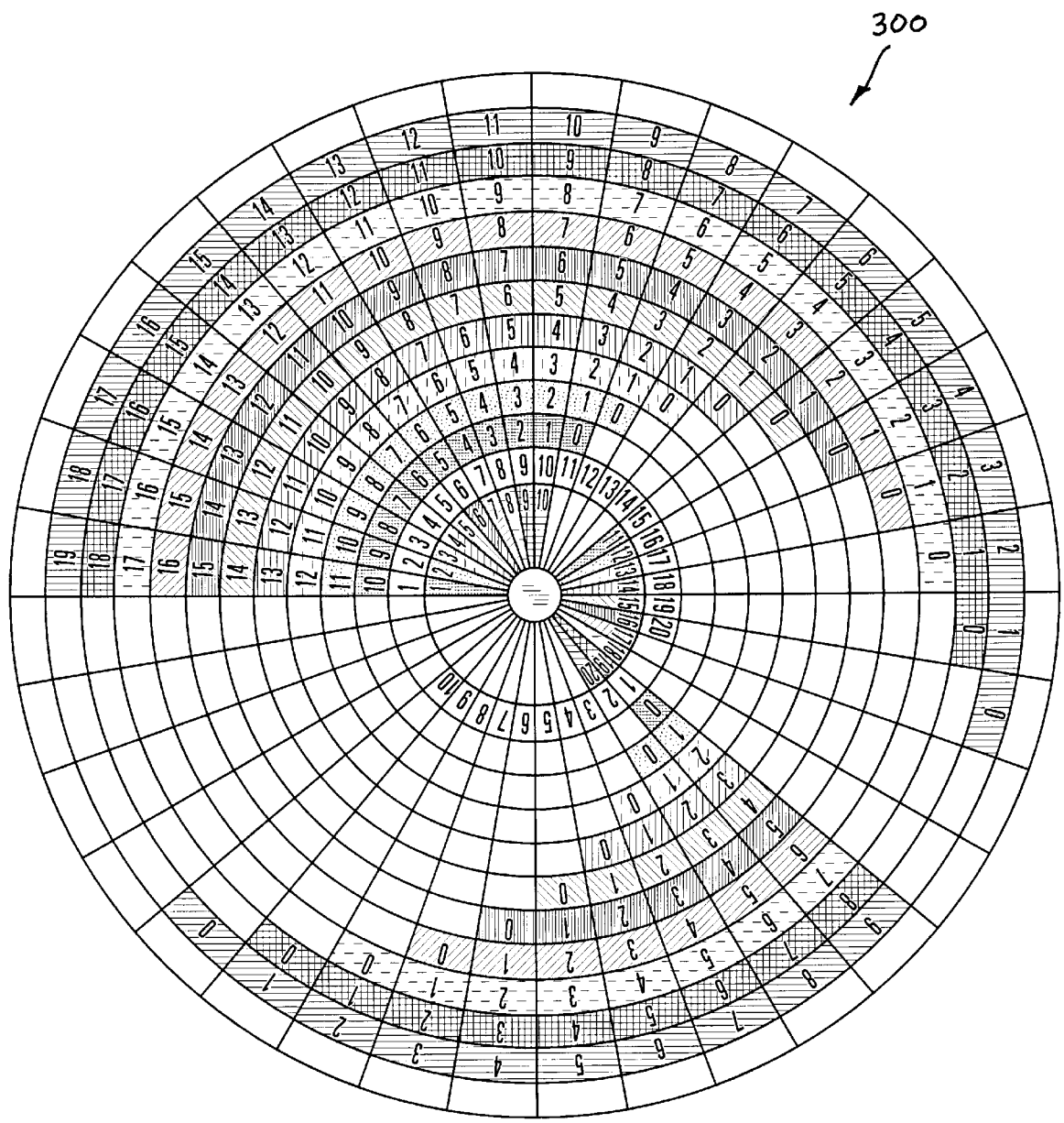
FIG. 6 is a plan view of a further embodiment of an apparatus for educating mathematical functions.
Figure 6A:
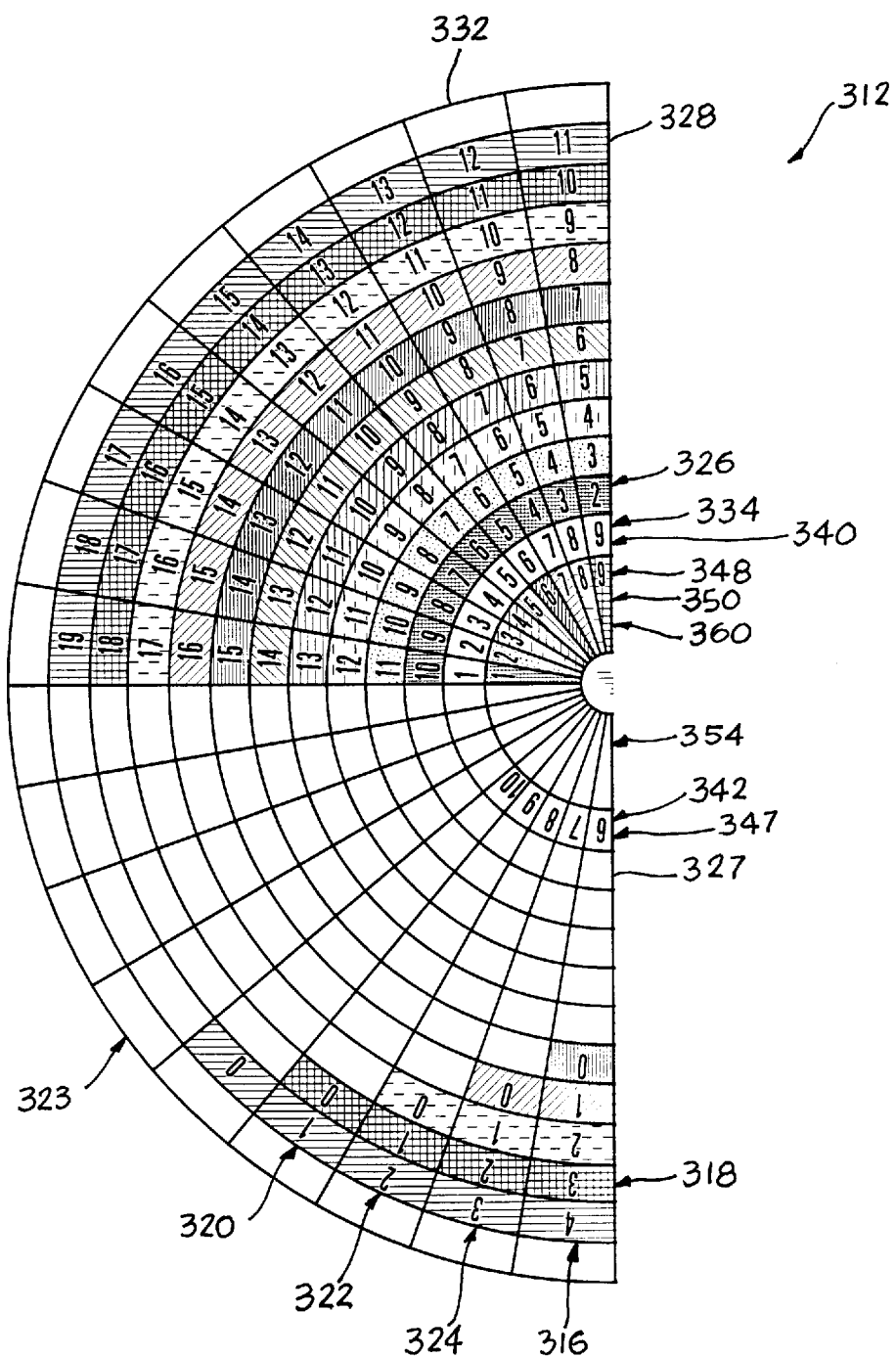
FIG. 6A is a plan view of the left-half of the apparatus of FIG. 6 which permits the use of reference characters for a description of the apparatus.

The embodiment shown in FIGS. 6 and 6A is directed to an apparatus 300 for educating the mathematical functions of subtraction. The apparatus comprises a first means 312 for indicating a plurality of first numerical sequences, each numeral within each first numerical sequence being identified by a common indicia 316 and each of the plurality of first numerical sequences having a different indicia 318. The embodiment of FIGS. 6 and 6A is illustrative of the subtraction of a first series of numerals from one to ten and a second series of numerals from eleven to twenty. In the embodiment of FIGS. 6 and 6A the plurality of first numerical sequences is shown as two series of numerical sequences of the numerals zero to nine and zero to nineteen; however the number can be selected as desired. The plurality of first numerical sequences are formed in a plurality of concentric circles which may be circular bands 320, divided into a plurality of radial segments 322, e.g., thirty-six. Selected radial segments 320 are identified by numerals and selected radial segments 323 are unnumbered. There are twenty-nine numbered radial segments. Each radial segment comprises ten arcuate segments 324 of each of the ten concentric circles 320. Each of the ten concentric circles 320 is identified by different indicia 318 and as shown the indicia is pattern selective. Alternatively, the different indicia 318 may be color selective. Selected numbered arcuate segments 324 is identified by a numeral of the numerical sequence wherein each numeral is a whole integer and the arithmetical value of the difference between each numeral in each numbered arcuate segment 324 is a whole integer. A whole integer numeral identifies each of the selected adjacent numbered arcuate segments 324 of each concentric circle 320 and the arithmetical value of the difference between each numeral is a whole integer. As shown in FIG. 6A, for example, a given numbered radial segment in one series having a radially innermost numbered arcuate segment 326 of the first means 312 is identified by the numeral two and consecutively increases by one for each numbered arcuate segment of the same radial segment to the radially outermost numbered arcuate segment 328 which is identified by the numeral eleven and the arithmetical value of the difference between each identifying numeral is one. In a selected radial segment having numbered arcuate segments circumferentially adjacent to the given numbered radial segment of the first series, the radially innermost numbered arcuate segment of the first means 312 is identified by the numeral three and consecutively increases by one for each numbered arcuate segment of the same radial segment to the radially outermost numbered arcuate segment 332 which is identified by the numeral twelve and the arithmetical value of the difference between each identifying numeral is one. As shown in FIGS. 6 and 6A, and for the remaining radial segments of the first series, each of the radially innermost numbered arcuate segments of the first means is identified by the numerically consecutive numerals zero to two and five to nineteen. Each of the radially innermost numbered arcuate segments identified by the numerically consecutive numerals of the first sequence increases by the arithmetical difference value of one to the outermost numbered arcuate segment identified by the numeral nineteen. As shown in FIG. 6, for example, a given numbered radial segment in a second series having a radially innermost segment 327 of the first means 312 is identified by the numeral zero and consecutively increases by one for each numbered arcuate segment of the same radial segment to the outermost numbered arcuate segment which is identified by the numeral nine and the arithmetical value of the difference between identifying numeral is one. In a selected radial segment having numbered arcuate segments circumferentially adjacent to the given numbered radial segment of the second series, the radially innermost numbered arcuate segment of the first means 312 is identified by the numeral zero and consecutively increases by one for each numbered arcuate segment of the same radial segment to the radially outermost numbered arcuate segment 332 which is identified by the numeral eight and the arithmetical value of the difference between each identifying numeral is one. As shown in FIGS. 6 and 6A, and for the remaining radial segments of the second series, each of the radially innermost numbered arcuate segments of the second means is identified by the numerically consecutive numerals zero to seven, zero to six, zero to five, zero to four, zero to three, zero to two, zero to one and zero.

The arithmetical difference in the numerals identifying adjacent numbered arcuate segments of the same concentric circle is a whole integer. The radially innermost numbered arcuate segment of the first means has the lowest numeral identification beginning with the numeral zero and increases progressively and circumferentially for the numbered arcuate segments in the same concentric circle by an arithmetical increase of one to the numeral identification nine in one series and nineteen in another series. The immediately circumferentially adjacent numbered arcuate segments has a lowest numeral identification beginning with the numeral zero and increases progressively and circumferentially for the numbered arcuate segments in the same concentric circle by an arithmetical increase of one to the numeral identification nine in one series and nineteen in another series. In the embodiment of FIG. 6 each of the first and second series of numerals and the numerals of circumferentially adjacent radial and arcuate numbered segments are circumferentially offset.

It is therefore apparent that the identifying numerals within each of the numerical sequences, in each of the numbered radial segments 322 and the numbered arcuate segments 324 for each of the concentric circles 320 of the first means 312 have an arithmetical difference by a whole integer.

The embodiment shown in FIGS. 6 and 6A further comprises a second means 334 for indicating a second numerical sequence of a first and second series of numerals. The second means 334 is a circle which may be a circular band 338 radially inwardly adjacent to the innermost circular band of the first means 312 and concentric with the circular bands 320 of the first means 312. The second means 334 is divided into a plurality of radial segments 340 corresponding to the number of radial segments 322 of the first means, e.g., thirty-six. Selected radial segments 320 are identified by numerals and selected radial segments 323 are unnumbered. There are thirty numbered radial segments. Each radial segment comprises thirty-six numbered arcuate segments 342. Each of the numbered radial segments 340 and numbered arcuate segments 342 of the second means 334 is identified by a common indicia 344 which is different from the common indicia 316 and different indicia 318 identifying the first means 312. Each of the numbered radial segments 340 and numbered arcuate segments 342 of the second means 334 is identified by a numeral of a second numerical sequence of a first and second series of consecutive numerals. In the embodiment shown in FIGS. 6 and 6A the numerals in a first series begin with the numeral one and continue consecutively to the numeral twenty and in a second series the numerals begin with the numeral one and continue consecutively to the numeral ten.

The embodiment shown in FIGS. 6 and 6A further includes a selector means 348 relatively movable in a circular direction with respect to the first means 312 and second means 334. As shown in the embodiment of FIGS. 6 and 6A, the selector means 348 comprises a circular member 350 having a center substantially concentric with the circular bands 320, 338, respectively of the first means 312 and second means 334. The selector means 348 is divided into a plurality of thirty-six radial segments 354, wherein each radial segment comprises thirty-six arcuate segments 356. Selected radial segments of the radial segments 354 are identified by numerals and selected radial segments of the radial segments are unnumbered. Selected radial segments 354 of the selector means 348 is identified by a numeral of a third numerical sequence of a first and second series of consecutive numerals. The third numerical sequence of the selector means 348 is the radially innermost concentric circle. In the embodiment shown in FIG. 6, the numerals of the first series begin with the numeral one and continue consecutively to the numeral ten and in the second series begin with the numeral one and continue consecutively to the numeral twenty. Each numeral in the third numerical sequence has an indicia 360 corresponding to the common indicia 318 and different indicia 320 of the first numerical sequence.

Each numeral of the plurality of the first, second and third numerical sequences is arranged in a radial order on the concentric circles 320, 338, 350, respectively, each numeral having the different indicia 318 and each numeral differs by a whole integer.

The method of operating the embodiment of FIG. 6 for subtraction is the same as for FIG. 5.

The numbered radial segments of the embodiments of FIG. 1, 5, 6 and 7 may be further radially extending with further numbered radial segments to numerals higher than shown in the illustrative embodiments.

As shown in FIGS. 2 to 4, optionally protruding from substantially the center of the selector means 48 is an extension 62 which may assist in the relative movement. As shown in FIGS. 2 to 4 the selector means 48 can be affixed to the first means 12 and second means 34 through substantially the concentric centers of the first means and second means by a suitable fastener 64, such as a threaded nut and screw, rivet, paper fastener, cotter pin and the like. The selector means 48 or the extension 62 may include a pointer or marker to assist in indicating the numeral of the third numerical sequence.

FIGS. 2 to 4 show several embodiments for the manufacture or assembly of the first means, second means and selector means of FIGS. 1, 1A, 5, 5A, 6, 6A, 7 and 7A. In FIGS. 2 and 3 the first means and second means are formed on or in a substantially common coplanar planes. In FIG. 2 the first means and the second means are formed in or on a support 66. Alternatively, the selector means 48 can be formed substantially coplanar with the first means and second means. In FIG. 2 the numerical sequences of the first means and second means are formed on or in a surface common to the selector means. The selector means 48 in FIGS. 2 and 3 is affixed to the common support essentially through the substantial center of the concentric bands. In FIG. 3, the bands 20, 38 of the first means 12 and second means 34, respectively, may be formed by a plurality of separate concentric nested members 68 wherein the numerical sequences respectively are formed on or in the circular peripheral surfaces 70 of the members common to the selector means. In FIG. 3, the members 68 may be provided with a common support in which all of the members are nested in substantially a co-planar plane. In FIG. 4, the bands of the first means and second means are formed by a plurality of concentric members 72 of decreasing diameter. The numerical sequences of the first and second means are formed on or in the exposed peripheral surface 74 of the members. The concentric members 72 can be formed as separate planar members or an integral one-piece construction in whole or in part. The separate planar members are disposed in a stacked relationship in different co-planar planes. In FIG. 4, the selector means 48 is affixed through the plurality of concentric members 68 of decreasing diameter. In FIGS. 2 to 4, the selector means 48 indicating the third numerical sequence, is disposed in a co-planar plane different than the planes indicating the first numerical and second numerical sequences. In FIGS. 2 to 4, the assembled apparatus may be self-supporting or may be further supported by a frame.

In FIGS. 2 to 4, the numerical sequences, common and different indicia of the first and second means may formed by known manufacturing techniques, including for example, etching, vapor deposition, painting, printing, and coloring instruments such as crayons, pencils, pens and markers. Materials for the apparatus can be paper of various kinds, metal, wood and plastic and the like.

Of particular interest to the learning experience and to the user, such as in the elementary school grades, is the manual construction or assembly of the apparatus. The embodiments of FIG. 2 to 4 can be created using suitable writing instruments and coloring instruments, colored craft paper, and commonly available school supplies, e.g., a ruler, compass, a protractor, a scissors and a fastener. The concentric members 68 of the embodiment of FIG. 3 can be assembled by the user.

The embodiments of the present invention are directed to the arithmetic functions of addition, subtraction, multiplication and division. The general inventive concept of the embodiments may also be applicable to other arithmetic functions such as, powers, exponents and roots.

Various modifications in structure, function and steps and equivalents thereof may be made by one skilled in the art to the disclosed embodiments.

What is claimed is:

1. A method comprising the steps of:
   providing a plurality of first numerical sequences, each numeral within each of said first numerical sequence being identified by a common indicia and each of the plurality of first numerical sequences having different indicia;
   providing a second numerical sequence of numerals;
   providing a third numerical sequence, each numeral in the third numerical sequence having an indicia corresponding to the common and different indicia of the first numerical sequence;
   wherein each of the numerals of the plurality of the first, second and third numerical sequences is arranged as respective radial segments in concentric circles, each concentric circle having the common indicia and wherein each numeral differs by a whole integer and at least two radial segments of the numerical sequences are in abutting relationship;
   aligning a selected numeral from each of the second and third numerical sequences whereby when the numeral of the first numerical sequence is a mathematical function of the numerals of the second and third numerical sequences the indicia of the third sequence is the same as the indicia of the first sequence.

2. The method of claim 1 wherein the third numerical sequence is the innermost concentric circle.

3. The method of claim 1 wherein each numeral of the plurality of the first, the second and the third numerical sequences is arranged in a radial order on the concentric circles, each numeral having the different indicia and wherein each numeral differs by a whole integer.

4. The method of claim 1 wherein the numerals within each of the plurality of the first, the second and the third numerical sequences differ by a whole integer.

5. The method of claim 1 wherein the numerals within each of the plurality of the first, the second and the third numerical sequence differ by a multiple of a whole integer.

6. The method of claim 1 wherein the mathematical function is addition, subtraction, multiplication or division.

7. The method of claim 1 wherein the indicia is color.

8. The method of claim 1 wherein all of the radial segments of the concentric circles are in abutting relationship with a respective adjacent radial segment.

9. An apparatus comprising:
   a first means for indicating a plurality of first numerical sequences, each numeral within each first numerical sequence being identified by a common indicia and each of the plurality of first numerical sequences having different indicia;
   a second means for indicating a second numerical sequence of numerals;
   a selector means relatively movable with respect to the first and second means for selecting one numeral of the second sequence of numerals, the selector means having a third numerical sequence, each numeral in the third numerical sequence having an indicia corresponding to the common and different indicia of the first numerical sequence;
   wherein each of the numerals of the plurality of the first, second and third numerical sequences is arranged as respective radial segments in concentric circles, each concentric circle having the common indicia and wherein each numeral differs by a whole integer and at least two radial segments of the numerical sequences are in abutting relationship;
   whereby when the numeral of the first numerical sequence is a mathematical function of the numerals of the second and third numerical sequences the indicia of the third sequence is the same as the indicia of the first sequence.

10. The apparatus of claim 9 wherein the third numerical sequence is the innermost concentric circle.

11. The apparatus of claim 9 wherein each numeral of the plurality of the first, the second and the third numerical sequences is arranged in a radial order on the concentric circles, each numeral having the different indicia and wherein each numeral differs by a whole integer.

12. The apparatus of claim 9 wherein the numerals within each of the plurality of the first, the second and the third numerical sequences differ by a whole integer.

13. The apparatus of claim 9 wherein the numerals within each of the plurality of the first, the second and the third numerical sequence differ by a multiple of a whole integer.

14. The apparatus of claim 9 wherein the indicia is color.

15. The apparatus of claim 9 wherein the first, second and third numerical sequences are arranged in substantially co-planar planes.

16. The apparatus of claim 9 wherein the first and the second numerical sequences are arranged in a substantially common plane.

17. The apparatus of claim 9 wherein the first, the second and the third numerical sequences are each arranged in concentric planes.

18. The apparatus of claim 9 wherein the third numerical sequence is arranged in a plane different than the first and second numerical sequences.

19. The apparatus of claim 9 wherein the mathematical function is addition, subtraction, multiplication or division.

20. The apparatus of claim 9 wherein all of the radial segments of the concentric circles are in abutting relationship with a respective adjacent radial segment.

\* \* \* \* \*

UNITED STATES PATENT AND TRADEMARK OFFICE
CERTIFICATE OF CORRECTION

PATENT NO : 5,827,067
DATED : OCTOBER 27, 1998
INVENTOR(S) : IRMA MARITZA PEREZ

It is certified that error appears in the above-identified patent and that said Letters Patent is hereby corrected as shown below:

On the title page change "20 Claims" to -- Claims 32--.
Add claims 21 to 32 as follows:

21. An apparatus comprising:
a first indicator of a plurality of first numerical sequences, each numeral within each first numerical sequence being identified by a common indicia and each of the plurality of first numerical sequences having a different indicia;
a second indicator of a second numerical sequence of numerals;
a numeral selector relatively movable with respect to the first and second indicators for selecting one numeral of the second sequence of numerals, the selector having a third numerical sequence of numerals, each numeral in the third numerical sequence having an indicia corresponding to the common indicia and different indicia of the first numerical sequence,
wherein each of the numerals of the plurality of the first, second and third numerical sequences is arranged as respective radial segments in concentric circles, each concentric circle having the common indicia and wherein each numeral differs by a whole integer and at least two radial segments of the numerical sequences are in abutting relationship;
whereby when the numeral of the first numerical sequence is a mathematical function of the numerals of the second and third numerical sequences the indicia of the third sequence is the same as the indicia of the first sequence.

22. The apparatus of claim 21 wherein the third numerical sequence is the innermost concentric circle.

23. The apparatus of claim 21 wherein each numeral of the plurality of the first, the second and the third numerical sequences is arranged in a radial order on the concentric circles, each numeral having the different indicia and wherein each numeral differs by a whole integer.

24. The apparatus of claim 21 wherein the numerals within each of the plurality of the first, the second and the third numerical sequences differ by a whole integer.

25. The apparatus of claim 21 wherein the numerals within each of the plurality of the first, the second and the third numerical sequence differ by a multiple of a whole integer.

26. The apparatus of claim 21 wherein the indicia is color.

27. The apparatus of claim 21 wherein the first, second and third numerical sequences are arranged in substantially common co-planar planes.

28. The apparatus of claim 21 wherein the first and the second numerical sequences are arranged in a substantially common co-planar planes.

UNITED STATES PATENT AND TRADEMARK OFFICE
CERTIFICATE OF CORRECTION

PATENT NO : 5,827,067
DATED : OCTOBER 27, 1998
INVENTOR(S) : IRMA MARITZA PEREZ

It is certified that error appears in the above-identified patent and that said Letters Patent is hereby corrected as shown below:

29. The apparatus of claim 21 wherein the first, the second and the third numerical sequences are each arranged in concentric planes.

30. The apparatus of claim 21 wherein the third numerical sequence is arranged in a plane different than the first and second numerical sequences.

31. The apparatus of claim 21 wherein the mathematical function is addition, subtraction, multiplication or division.

32. The apparatus of claim 21 wherein all of the radial segments of the concentric circles are in abutting relationship with a respective adjacent radial segment.

Signed and Sealed this

Sixteenth Day of March, 1999

Attest:

Q. TODD DICKINSON

Attesting Officer

Acting Commissioner of Patents and Trademarks